US008449228B2

(12) United States Patent
Guy

(10) Patent No.: US 8,449,228 B2
(45) Date of Patent: May 28, 2013

(54) CUTTING TOOL AND HOLDER

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 500 days.

(21) Appl. No.: 12/848,754

(22) Filed: Aug. 2, 2010

(65) Prior Publication Data
US 2011/0064529 A1    Mar. 17, 2011

(30) Foreign Application Priority Data

Sep. 16, 2009 (IL) .......................................... 200980

(51) Int. Cl.
*B23B 31/107* (2006.01)
(52) U.S. Cl.
CPC .................................... *B23B 31/107* (2013.01)
USPC ..................... 408/240; 408/226; 79/71; 79/81
(58) Field of Classification Search
CPC ..................................................... B23B 31/107
USPC ................. 279/71, 81; 408/240, 239 R, 238, 408/226; 407/102, 106
See application file for complete search history.

(56) References Cited

U.S. PATENT DOCUMENTS

| 3,734,517 A * | 5/1973 | Benjamin ......................... 279/81 |
| 5,542,797 A * | 8/1996 | Obermeier ..................... 408/226 |
| 5,577,743 A | 11/1996 | Kanaan et al. |
| 5,788,430 A * | 8/1998 | Meyen et al. ................. 408/226 |
| 5,807,040 A * | 9/1998 | Bongers-Ambrosius et al. ............................. 408/226 |
| 5,868,209 A * | 2/1999 | Wierspecker et al. ......... 173/213 |
| 6,726,222 B2 * | 4/2004 | Rohm et al. ..................... 279/71 |
| 7,112,020 B2 * | 9/2006 | Sheffler et al. ................ 409/234 |
| 7,648,315 B2 * | 1/2010 | Omi et al. ........................ 408/57 |
| 8,020,876 B2 * | 9/2011 | Lin ................................. 279/71 |
| 2005/0285355 A1 | 12/2005 | Lin |
| 2007/0296162 A1 | 12/2007 | Guy |
| 2009/0110500 A1* | 4/2009 | Miller et al. .................. 408/204 |

FOREIGN PATENT DOCUMENTS

| EP | 0 385 280 | 1/1995 |
| JP | 63306848 A * | 12/1988 |
| JP | 2002018613 A * | 1/2002 |

OTHER PUBLICATIONS

International Search Report in PCT/IL2010/000573, dated Mar. 12, 2010.

* cited by examiner

*Primary Examiner* — Daniel Howell
*Assistant Examiner* — Nicole N Ramos
(74) *Attorney, Agent, or Firm* — Womble Carlyle

(57) ABSTRACT

A cutting tool has a cutting insert and a holder. The cutting insert has a cutting portion and an insert shank with a cylindrical portion and a non-cylindrical portion. The holder has a clamping portion which has a clamping sleeve and a cage located therein. The cage includes a load member housing with a load member. The cage has a major abutment wall connected to a minor abutment wall. The clamping sleeve has first and second inner sections defined by points $P_1$ and $P_2$. A point $P_3$ divides the second inner section into first and second portions. The clamping sleeve is rotatable between a secured and a released position of the cutting tool. In the secured position, the non-cylindrical portion abuts the major abutment wall, the cylindrical portion abuts both the minor abutment wall and the load member, and the load member abuts the first portion.

15 Claims, 6 Drawing Sheets

CUTTING TOOL AND HOLDER

FIELD OF THE INVENTION

The present invention relates generally to metal cutting tools. Specifically, it relates to replaceable cutting inserts having an elongated and generally cylindrical shank, accurately securable in the cutting tools.

BACKGROUND OF THE INVENTION

In this field there are known several methods of clamping a generally cylindrical shank into the clamping portion of a cutting tool. One method makes use of a conical collet and a sleeve, thread rotated around the collet to reduce its diameter, thereby clamping the shank of the cutting insert. This clamping method has a disadvantage in that after the cutting insert is replaced, it is difficult to position the new cutting insert in the exact original orientation of the old cutting insert. Repeatability of the orientation of a cutting insert is a very important feature when it comes to machining, for example, small internal bores. The slightest deviation in the orientation or position of the shank end is magnified at the cutting portion end, most likely resulting in a faulty surface finish.

In EP 0385280 an internal turning chisel is described to have a hook-ended tool, clampable into a recess located in the chuck portion of the chisel. In this clamping method, a clamp screw is threaded into the chuck, pressing against the shank portion of the hook-ended tool which is located within the recess. Consequently, the shank portion is pressed against the other side of the chuck, with respect to the clamp screw. Although this method is better than the collet method in terms of repeatability, it has certain disadvantages. For one, the clamp screw applies force to a single point at one end of the hook-ended tool. Therefore, the force is applied asymmetrically with respect to the tool's longitudinal axis. Another aspect of this method is that, as with most types of screws, there is a limit to the amount of torque the screw can sustain and consequently apply on the shank. Therefore, without using a special torque-limiting tool, plastic deformation may develop in the threads of either the screw or the screw bore. This may prove to be problematic in terms of repeatability. There is yet another aspect which pertains to most clamping methods which require the use of screws. The process of turning a screw is time consuming and for the most part, there is a need for a torque applying tool (e.g. a screwdriver). For example: positioning the screwdriver over the screw head, turning the screwdriver in one direction, replacing the tool and then turning the screw in the other direction.

SUMMARY OF THE INVENTION

In accordance with the present invention there is provided a cutting tool comprising a cutting insert and a holder, the holder having a longitudinal holder axis H.

The holder comprises a holder shank and a clamping portion. The clamping portion comprises a clamping sleeve and a cage located within the clamping sleeve. The clamping sleeve has a longitudinal sleeve axis S defining a releasing direction D, the cage comprising at least one load member housing having a load member accommodated therein. The cage having inner and outer cage surfaces, the inner cage surface comprising a major abutment wall connected to a minor abutment wall, the major abutment wall forming an angle $\alpha \leq 90°$ with a plane T tangent to the minor abutment wall. The inner cage surface further comprises a stopper wall perpendicular to the minor and major abutment walls, the minor and major abutment walls being parallel to the holder axis H. The clamping sleeve has inner and outer sleeve surfaces, the inner sleeve surface comprising first and second inner sections extending over a given length parallel to the sleeve axis S and defined by points $P_1$ and $P_2$ in a cross section taken perpendicular to the sleeve axis S. A point $P_3$ further from the sleeve axis S than the points $P_1$ and $P_2$ divides the second inner section into first and second portions.

The cutting insert has an insert axis B and comprises an insert shank and a cutting portion, the insert shank having a peripheral surface comprising a cylindrical portion and a non-cylindrical portion, the cutting portion having a cutting tip which includes at least one cutting edge.

The clamping sleeve is rotatable between a secured and a released position of the cutting tool. In the released position the load member is positioned between the second portion and the holder axis H. In the secured position, the load member is positioned between the first portion and the holder axis H, the non-cylindrical portion abuts the major abutment wall, the cylindrical portion abuts both the minor abutment wall and the load member, and the load member abuts the first portion.

In accordance with the present invention, the load member housing comprises a delimiting abutment surface and, in a secured position, the load member abuts both the delimiting abutment surface and the first portion of the clamping sleeve.

In accordance with some embodiments of the present invention, the load member has a cylindrical shape.

In accordance with the present invention, the cage opens out axially forwardly and through the load member housing.

In accordance with some embodiments of the present invention, the outer cage surface has a generally cylindrical shape.

In accordance with the present invention, part of the inner cage surface comprises a surface generally complementary in shape to the cylindrical portion of the insert shank.

In accordance with embodiments of the present invention, the minor abutment wall is flat and perpendicular to the major abutment wall.

In accordance with embodiments of the present invention, the first inner section of the clamping sleeve is cylindrical in shape.

In accordance with the present invention, the first inner section of the clamping sleeve is larger than the second inner section.

In accordance with embodiments of the present invention, the first and second portions have given arc lengths taken in a cross section perpendicular to the sleeve axis S, the arc length of the first portion being longer than the arc length of the second portion.

In accordance with the present invention, when the cutting tool is transferred from a released position to a secured position, the point $P_3$ passes over a farthest portion of the load member from the holder axis H.

In accordance with the present invention there is also provided a holder having a longitudinal holder axis H and comprising:

a holder shank and a clamping portion, the clamping portion comprising a clamping sleeve having a longitudinal sleeve axis S defining a releasing direction D and a cage located within the clamping sleeve, the cage comprising at least one load member housing having a load member accommodated therein, the cage having inner and outer cage surfaces, the inner cage surface comprising a major abutment wall connected to a minor abutment wall, the major abutment wall forming an angle $\alpha \leq 90°$ with a plane T tangent to the minor abutment wall; and a stopper wall perpendicular to the minor and major abutment walls, the minor and major abutment walls being parallel to the holder axis H; the clamping sleeve having inner and outer sleeve surfaces, the inner sleeve surface comprising first and second inner sections extending over a given length parallel to the sleeve axis S and defined by points $P_1$ and $P_2$ in a cross section taken perpendicular to the sleeve axis S; a point $P_3$ further from the sleeve axis S than the points $P_1$ and $P_2$ divides the second inner section into first and second portions.

According to the present invention there is yet further provided a method for assembling the cutting tool comprising the steps of:

rotating the clamping sleeve to the released position of the cutting tool;

introducing the insert shank into the cage until the rear surface of the cutting insert abuts the stopper wall of the cage; and rotating the clamping sleeve in the direction opposite to the releasing direction D until the cutting tool is in the secured position.

BRIEF DESCRIPTION OF THE DRAWINGS

For a better understanding of the present invention and to show how the same may be carried out in practice, reference will now be made to the accompanying drawings, in which.

Figure 1:
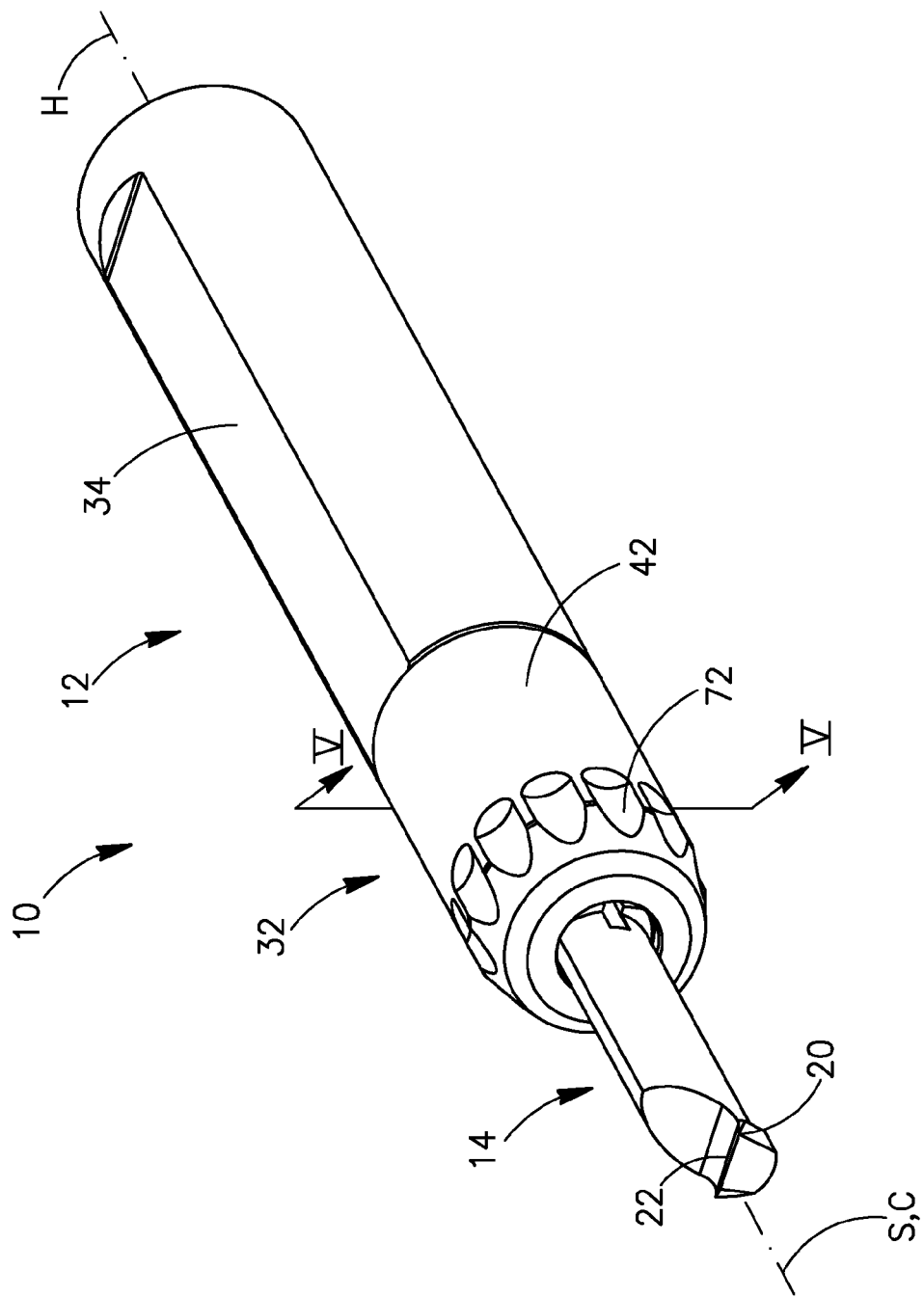
FIG. 1 is an isometric view of a cutting tool according to embodiments of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
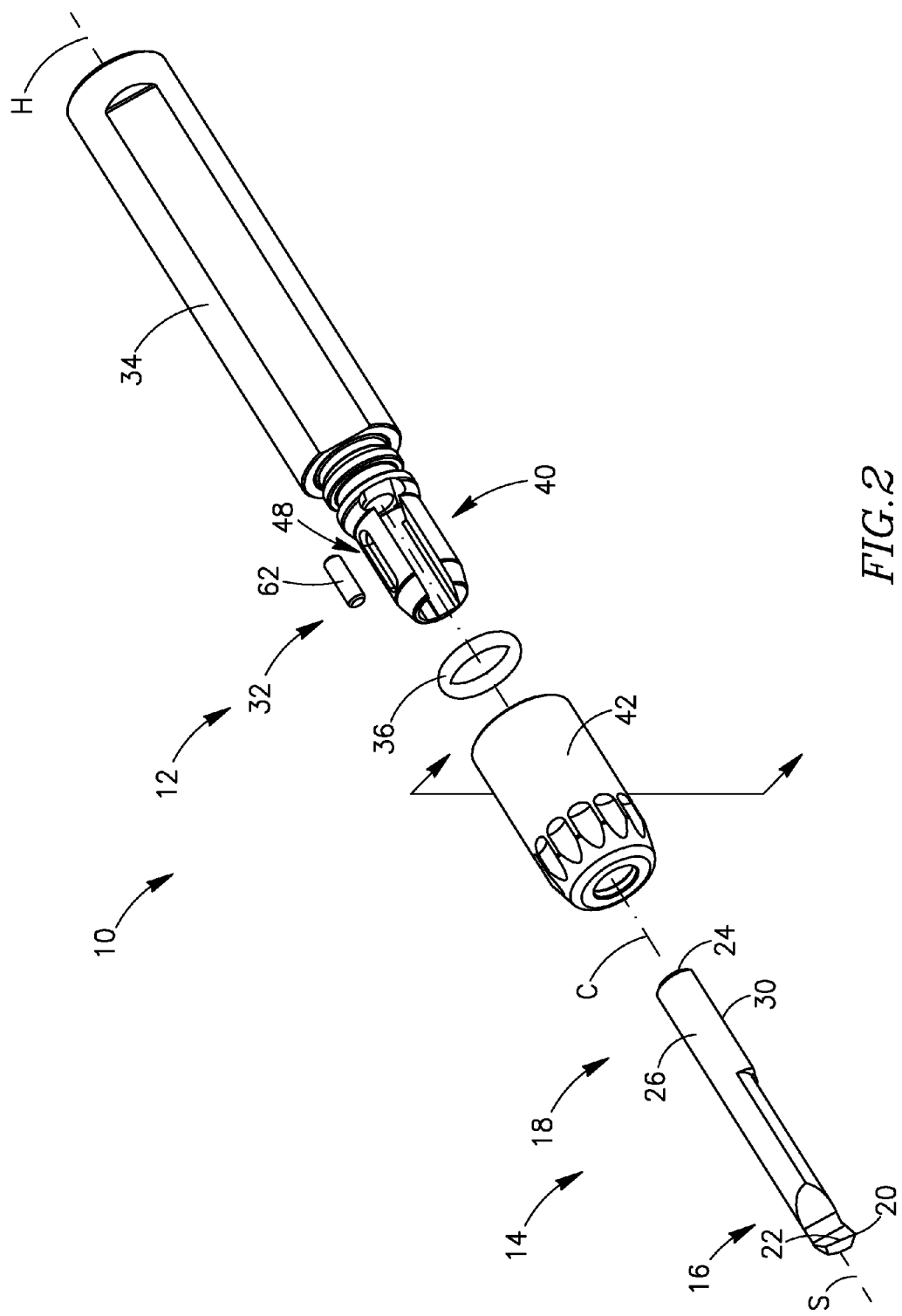
FIG. 2 is an exploded isometric view of the cutting tool of FIG. 1.

Reference is first made to FIGS. 1 and 2, showing respective isometric assembled and exploded views of a cutting tool 10 in accordance with embodiments of the invention. The cutting tool 10 includes a holder 12 and a cutting insert 14 releasably retained in the holder 12.

The cutting insert 14 has a longitudinal insert axis C defining a front-to-rear direction of the cutting insert 14, a cutting portion 16 at a front end of the cutting insert 14 and an insert shank 18 at a rear end of the cutting insert 14. The cutting portion 16 has a cutting tip 20 which includes at least one cutting edge 22. The insert shank 18 has a rear surface 24 and a longitudinally extending peripheral surface 26 extending forwardly from the rear surface 24. The peripheral surface 26 has a cylindrical portion 28 and a non-cylindrical, preferably flat portion 30.

The holder 12 has a holder axis H defining a forward-to-rearward direction of the holder 12, a clamping portion 32 at a forward end of the holder 12 and a holder shank 34 at a rearward end of the holder 12. The clamping portion 32 includes an o-ring 36, a cage 40 and a clamping sleeve 42 capable of elastic deformation. The o-ring 36 functions, firstly, as a sealant preventing spillage of coolant fluid from the clamping portion 32. Secondly, the o-ring 36 provides friction support, preventing the clamping sleeve 42 from becoming accidentally dislodged from the clamping portion 32.

Figure 3:
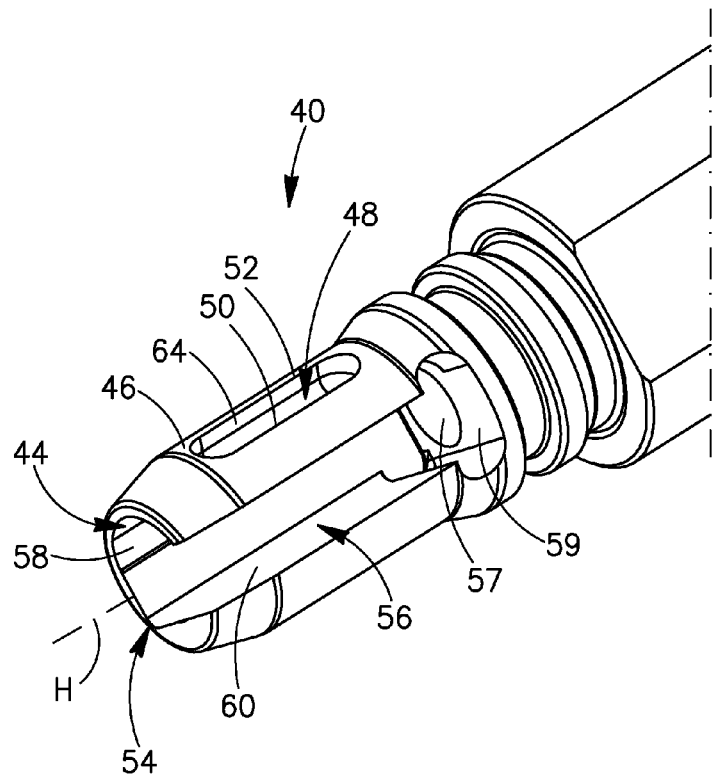
FIG. 3 is an isometric view of a cage seen in FIG. 2 in accordance with embodiments of the present invention.

Reference is now made to FIGS. 3 to 8. FIG. 3 shows an enlarged view of the cage 40. The cage 40 has inner and outer cage surfaces 44, 46 and a load member housing 48 opening out to both the inner and outer cage surfaces 44, 46 through inner and outer openings respectively 50, 52. A part of the inner cage surface 44 comprises a surface generally complementary in shape to the cylindrical portion 28 of the insert shank 18. The cage 40 opens out axially forwardly at a forward cage opening 54, through which the cutting insert 14 may be inserted and withdrawn. The cage 40 opens radially outwardly at a longitudinal cage opening 56 along the length of the cage 40, allowing easy access for machining of the inner cage surface 44. The cage is also provided with a rear aperture 57 formed by a coolant channel (not shown) passing through the holder shank 34, for providing coolant fluid to the cutting insert 14. The inner cage surface 44 has a minor abutment wall 58 and a preferably flat major abutment wall 60. The minor and major abutment walls 58, 60 extend along, and preferably are parallel to, the holder axis H.

In accordance with some embodiments, the major abutment 60 wall forms an angle $\alpha \leq 90°$ with a plane T tangent to the minor abutment wall 58 (see FIG. 7), taken at a region of contact between the peripheral surface 26 of the insert shank 18 and the minor abutment wall 58. In accordance with some embodiments, the minor abutment wall 58 is flat and the major abutment wall 60 forms an angle $\alpha \leq 90°$ with the minor abutment wall 58 (see FIG. 6).

The inner cage surface 44 has a stopper wall 59 located at a rearward end of the cage 40. The stopper wall 59 may be perpendicular to both the minor and major abutment walls 58, 60. The stopper wall 59 functions as an axial locating means for the cutting insert 14 and the minor and major abutment walls 58, 60 function as positioning means for the cutting insert 14 in a plane perpendicular to the holder axis H, thereby providing for the accurate positioning of the cutting insert 14 and consequently the cutting tip 20.

The load member housing 48 accommodates a load member 62 having a length $L_1$ and has a delimiting surface 64 and a delimiting abutment surface 66 which restrict the tangential movement of the load member 62. In accordance with some embodiments, the load member 62 is cylindrical in shape. Each containment surface 64, 66 extends from the inner opening 50 to the outer opening 52 and extends longitudinally through the length of the load member housing 48. The inner opening 50 of the load member housing 48 is narrower in width than the diameter of the load member 62, which prevents the load member 62 from passing through the inner opening 50. In accordance with some embodiments the inner opening 50 of the load member housing 48 is shorter in length than the length of the load member 62 which may also prevent the load member 62 from passing through the inner opening 50.

Figure 4:
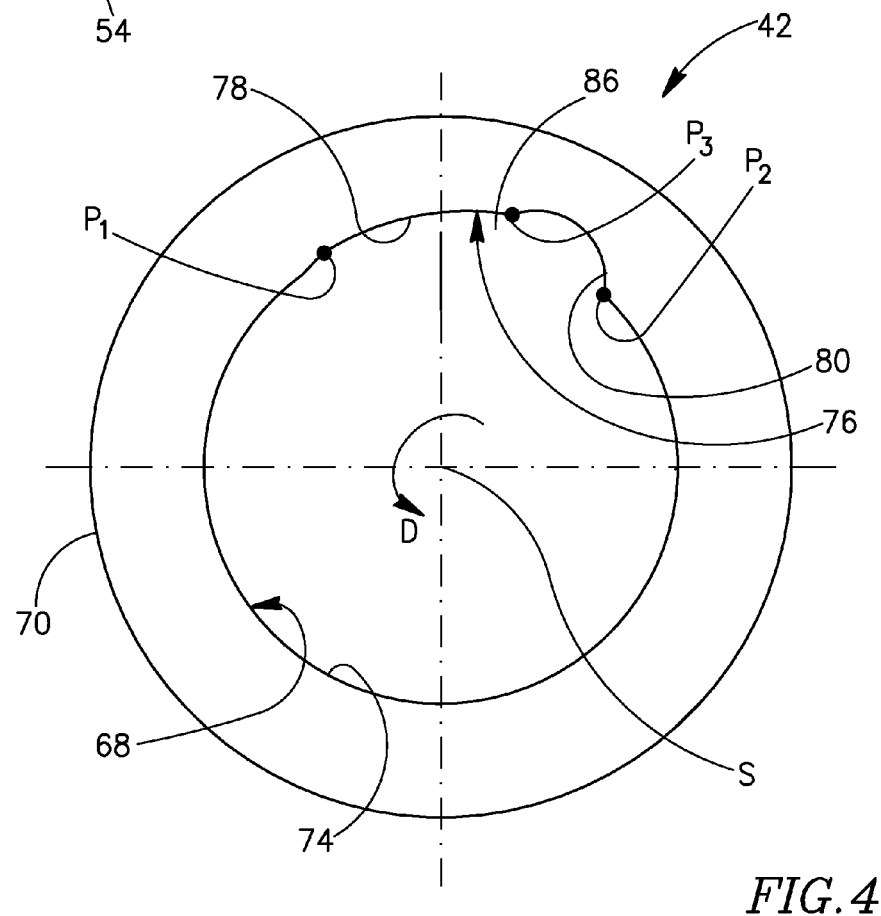
FIG. 4 is a cross-sectional view of the clamping sleeve, taken in a plane indicated by line IV-IV in FIG. 2.

Reference is made to FIG. 4, showing a cross section of the clamping sleeve 42 taken perpendicularly to a longitudinal sleeve axis S which defines a releasing direction D. The clamping sleeve 42 has inner and outer sleeve surfaces 68, 70 extending parallel to the sleeve axis S. The outer sleeve surface 70 has circumferential recesses 72 (see FIG. 2) formed to facilitate torque transfer.

The inner sleeve surface 68 has first and second inner sections 74, 76 extending longitudinally over a given length $L_2 > L_1$. The first and second inner sections 74, 76 are defined by points $P_1$ and $P_2$ in the cross section taken perpendicular to the sleeve axis S. The first inner section 74 is larger than the second inner section 76. The second inner section 76 contains a point $P_3$, which is located further from the sleeve axis S than the points $P_1$ and $P_2$ and which divides the second inner section 76 into first and second portions 78, 80. The first portion 78 has an arc length $P_3$-$P_1$ and the second portion 80 has an arc length $P_2$-$P_3$. The arc lengths are measured in a cross section taken perpendicular to the sleeve axis S in the releasing direction D. The arc length of the first portion 78 is longer than the arc length of the second portion 80 in a cross section taken perpendicular to the sleeve axis S.

Thus, it can be seen from the foregoing that the first inner section 74 follows a cylindrical contour and is connected at circumferentially opposite first and second locations (indicated in the cross-section of FIG. 4 by points $P_1$ and $P_2$) to the second inner section 76, and the second inner section 76 bulges in a radially outward direction and defines an inner sleeve recess 86 in the clamping sleeve 42, the inner sleeve recess 86 having a varying radial dimension and comprising first and second portions 78, 80 which meet at a third location (indicated in the cross-section of FIG. 4 by point $P_3$) on the inner surface that is farther from the sleeve axis (S) than the spaced apart circumferentially opposite first and second locations at which the first and second inner sections are connected.

Figure 5:
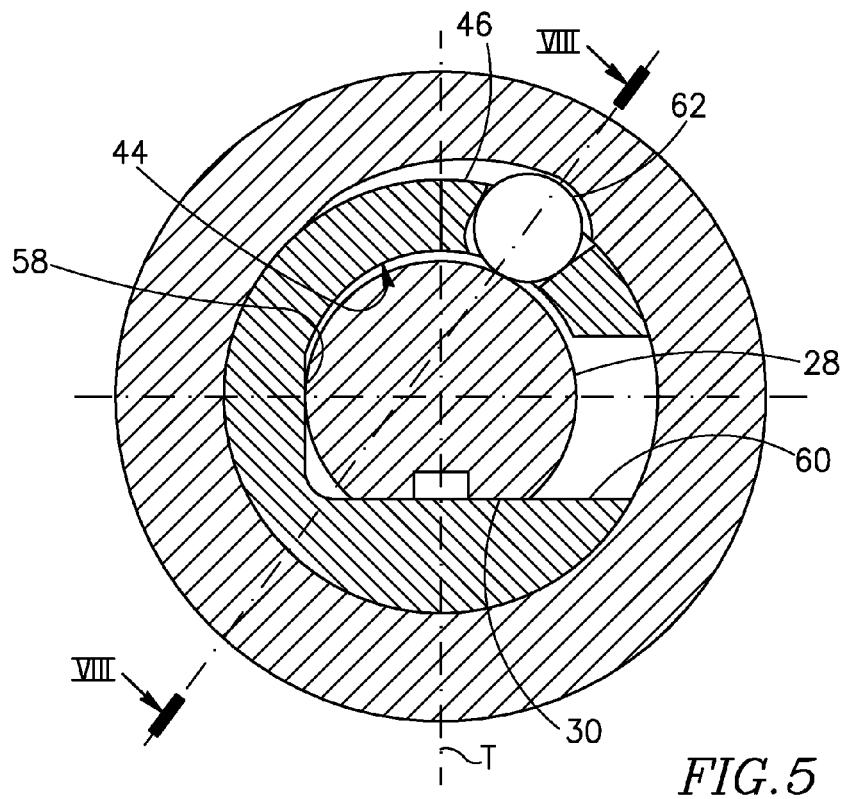
FIG. 5 is a cross-sectional view of the cutting tool in a released position, taken in a plane indicated by line V-V in FIG. 1.
Figure 6:
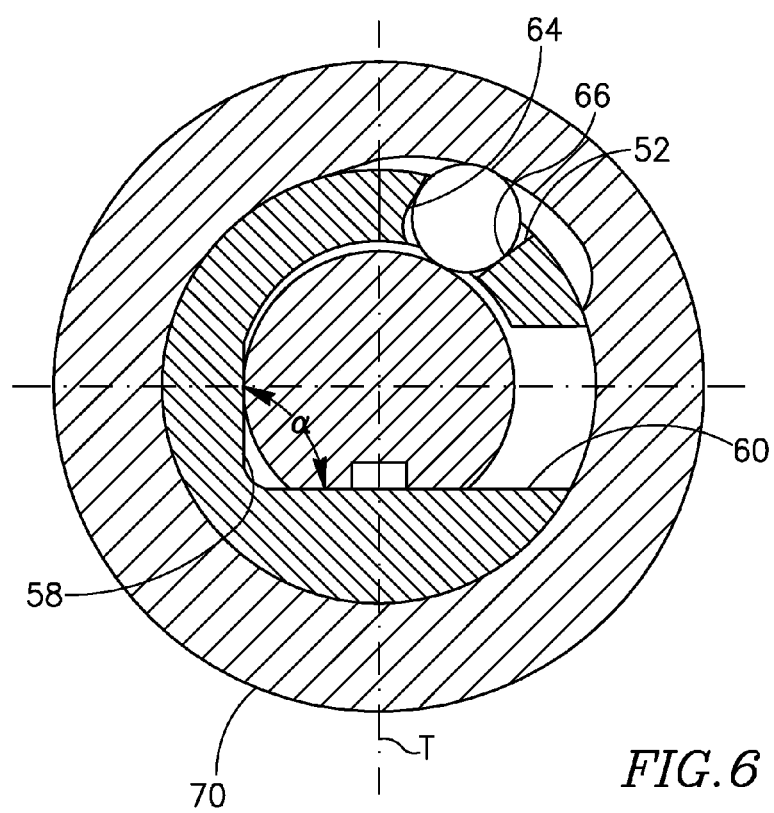
FIG. 6 is a cross-sectional view similar to that shown in FIG. 5 but with the cutting tool in a secured position.
Figure 7:
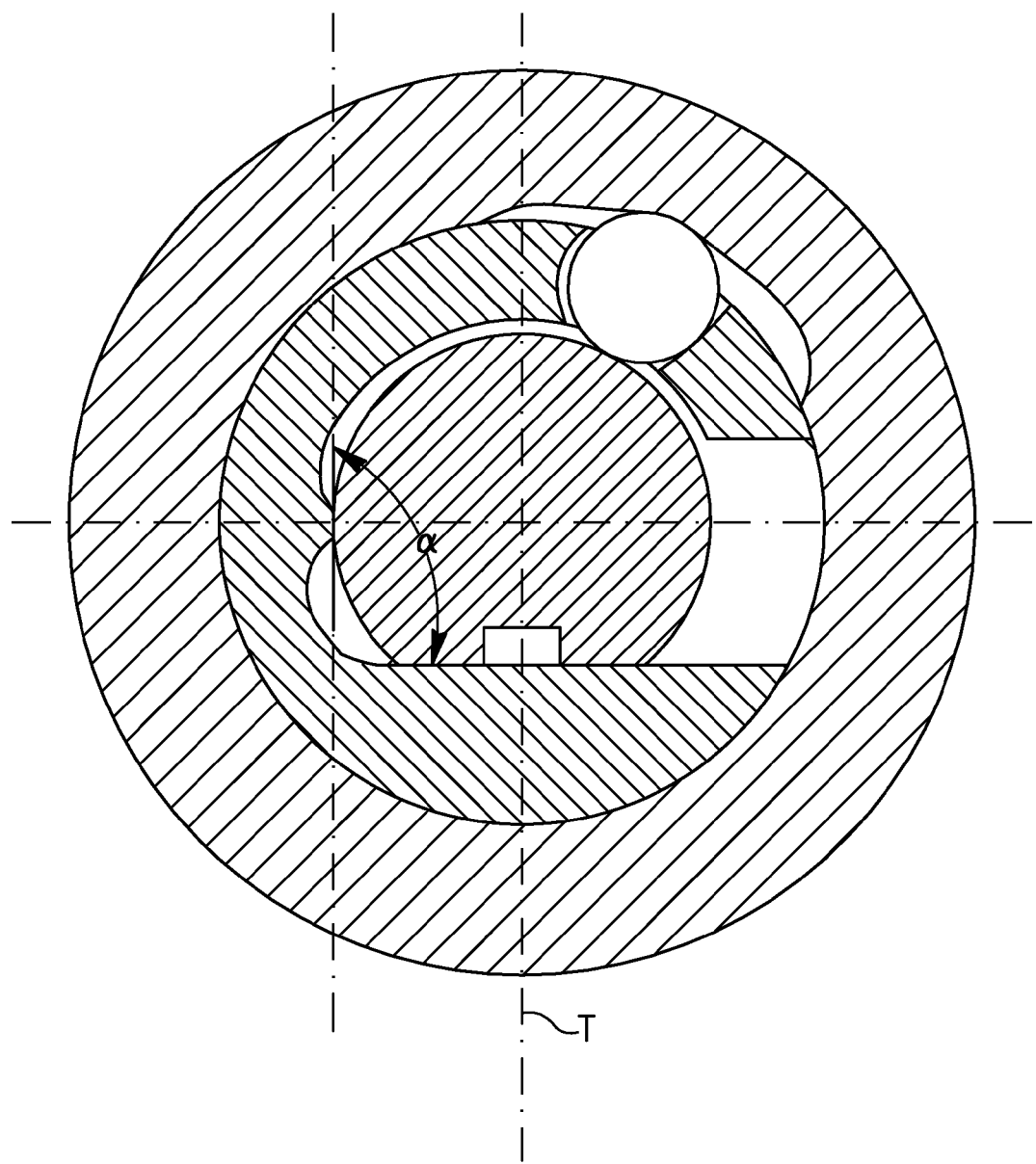
FIG. 7 is a cross-sectional view similar to that shown in FIG. 6 but for another embodiment of the cutting tool.
Figure 8:
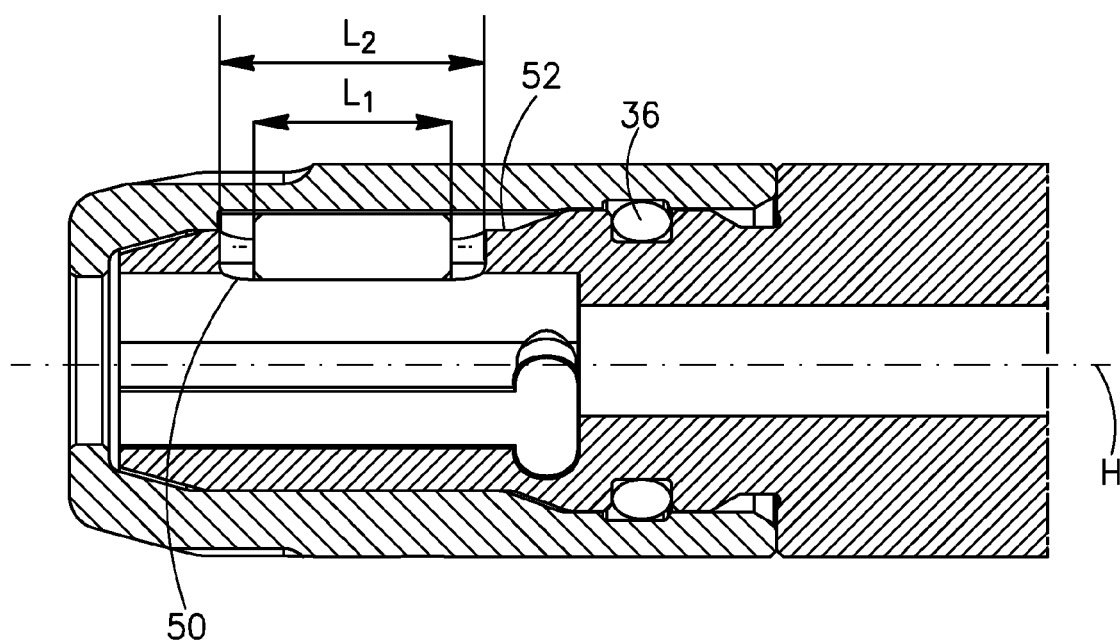
FIG. 8 is a cross-sectional view of the holder taken along line VIII-VIII in FIG. 5 with the cutting insert removed.

Securing the cutting insert 14 in the holder 12 is performed by rotating the clamping sleeve 42 from a released position of the cutting tool 10 (as shown in FIG. 5), to a secured position of the cutting tool 10 (as shown in FIGS. 6 and 7). As the clamping sleeve 42 is rotated from the released position to the secured position, force is applied by the clamping sleeve 42 on the load member 62 which in turn applies force to the cutting insert 14 on the cylindrical portion 28 of the cutting insert 14, which urges the cutting insert 14 against the minor and major abutment walls 58, 60.

When the cutting tool 10 reaches the secured position, the load member 62 is in clamping abutment with three surfaces: the second containing surface 66, the first portion 78 of the clamping sleeve 42 and the cylindrical portion 28 of the cutting insert 14. In this position, the cutting insert 14 is in clamping abutment with two other surfaces: the non-cylindrical portion 30 is in abutment with the major abutment wall 60 and the cylindrical portion 28 is in abutment with the minor abutment wall 58.

This abutment arrangement allows for a new cutting insert to be accurately positioned in the holder 12 when it replaces a worn cutting insert is. Consequently, the cutting tip 20 of the new cutting insert 14 is also accurately positioned, with respect to the position of the worn cutting tip 20 of the old cutting insert 14.

The location of the insert shank 18 (and consequently the cutting tip 20) in a plane perpendicular to the holder axis H is generally determined by the minor and major abutment walls 58, 60. A more accurate determination of the location of the cutting tip 20 is achieved by the surface finish quality of both the cylindrical and non-cylindrical portions 28, 30 of the insert shank 18. However, since the cutting tool 10 cuts in a general direction perpendicular to the major abutment wall 60, the location accuracy of the cutting tip 20 in that direction is unimportant. Consequently, there is no need to invest in a high surface finish for the non-cylindrical portion 30 of the shank 18. Another way of defining the correct positioning of the cutting tip 20 is that the cutting tip 20 is always positioned in a plane which passes through the holder axis H and being perpendicular to the major abutment wall 60.

When the cutting tool 10 is in the released position, so that the insert shank 18 can be inserted into the cage 40, there is only one possible orientation of the insert shank 18 for which it can fit into the inner cage surface 44 of the cage 40. Only when the non-cylindrical portion 30 of the insert shank 18 faces the major abutment wall 60 will the insert shank 18 fit into the inner cage surface 44. Furthermore, only when the cutting tool 10 is in the released position, will the load member 62 have enough room to shift outwardly in a general direction away from the holder axis H, towards the inner sleeve surface 68, allowing the insert shank 18 to fit inside the inner cage surface 44. When the cutting tool 10 is in a released position the load member 62 is located in the region of the first portion 78 and no force is applied by the clamping sleeve 42 on the load member 62. The first portion 78 is formed to partially accommodate the load member 62 and to act as a torque-limiting stopper, preventing the point $P_2$ from passing, or climbing, over the load member 62 as the clamping sleeve 42 is rotated in the releasing direction D. In the released position, the load member 62 is in a released state, and is not necessarily simultaneously in abutment with all the three surfaces: the second containing surface 66, the second portion 80 of the clamping sleeve 42 and the cylindrical portion 28 of the cutting insert 14.

When the clamping sleeve 42 is turned in the direction opposite to the releasing direction D, since the second inner section 76 is capable of elastic deformation, point $P_3$ is able to pass over the farthest point of the load member 62 with respect to the holder axis H. Since point $P_3$ is located further from the holder axis H than the point $P_1$, the distance between the first portion 78 and the holder axis H decreases gradually. This leads then to a build up of pressure on the load member 62, proportional to the amount of turning of the clamping sleeve 42.

The present invention allows for a quick and easy method of inserting the cutting insert 14 in the holder shank 34 and securing it therein, and a correspondingly quick and easy method for replacement of the cutting insert 14. All it requires of an operator facing the task of installing the cutting insert 14 is to make sure that the clamping sleeve 42 is positioned in the released position, introduce the insert shank 18 into the cage 40 until the rear surface 24 of the cutting insert 14 abuts the stopper wall 59 of the cage 40; and rotate the clamping sleeve 42 in the direction opposite to the releasing direction D until the cutting tool 10 is in the secured position. The rotation of the clamping sleeve 42 can be done either by hand, or by means of a torque transferring tool, such as a dedicated wrench. When the operator is required to replace a worn cutting insert 14, the method is very similar to the insertion method. The operator has to rotate the clamping sleeve 42 in the releasing direction D until the cutting tool 10 is in the released position, remove the worn cutting insert 14 from the cage 40 and then inserting the new cutting insert as described above.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool comprising a cutting insert and a holder, the holder having a longitudinal holder axis H and comprising:
    a holder shank and a clamping portion, the clamping portion comprising a clamping sleeve and a cage located within the clamping sleeve, the clamping sleeve having a longitudinal sleeve axis (S) defining a releasing direction (D), the cage comprising at least one load member housing having a load member accommodated therein, the cage having inner and outer cage surfaces, the inner cage surface comprising a major abutment wall connected to a minor abutment wall, the major abutment wall forming an angle $\alpha \leq 90°$ with a plane (T) tangent to the minor abutment wall; and a stopper wall perpendicular to the minor and major abutment walls, the minor and major abutment walls being parallel to the holder axis (H); the clamping sleeve having inner and outer sleeve surfaces, the inner sleeve surface comprising first and second inner sections extending over a given length parallel to the sleeve axis (S) and defined by points $P_1$ and $P_2$ in a cross section taken perpendicular to the sleeve axis (S); a point $P_3$ further from the sleeve axis (S) than the points $P_1$ and $P_2$ divides the second inner section into first and second portions;
    the cutting insert having an insert axis (B) and comprising an insert shank and a cutting portion, the insert shank having a peripheral surface comprising a cylindrical portion and a non-cylindrical portion, the cutting portion having a cutting tip which includes at least one cutting edge; wherein,
    the clamping sleeve is rotatable between a secured and a released position of the cutting tool;
    in the released position the load member is positioned between the second portion and the holder axis (H);
    in the secured position, the load member is positioned between the first portion and the holder axis (H), the non-cylindrical portion abuts the major abutment wall, the cylindrical portion abuts both the minor abutment wall and the load member, and the load member abuts the first portion.

2. The cutting tool according to claim 1, wherein the load member housing comprises a delimiting abutment surface and, in a secured position, the load member abuts both the delimiting abutment surface and the first portion of the clamping sleeve.

3. The cutting tool according to claim 1, wherein the load member has a cylindrical shape.

4. The cutting tool according to claim 1, wherein the cage opens out axially forwardly and through the load member housing.

5. The cutting tool according to claim 1, wherein the outer cage surface has a generally cylindrical shape.

6. The cutting tool according to claim 1, wherein part of the inner cage surface comprises a surface generally complementary in shape to the cylindrical portion of the insert shank.

7. The cutting tool according to claim 1, wherein the minor abutment wall is flat and perpendicular to the major abutment wall.

8. The cutting tool according to claim 1, wherein the first inner section of the clamping sleeve is cylindrical in shape.

9. The cutting tool according to claim 1, wherein the first inner section of the clamping sleeve is larger than the second inner section.

10. The cutting tool according to claim 1, wherein the first and second portions have given arc lengths taken in a cross section perpendicular to the sleeve axis S, the arc length of the first portion being longer than the arc length of the second portion.

11. The cutting tool according to claim 1, wherein when the cutting tool is transferred from a released position to a secured position, the point $P_3$ passes over a farthest portion of the load member from the holder axis (H).

12. A holder having a longitudinal holder axis (H) and comprising:
    a holder shank and a clamping portion, the clamping portion comprising a clamping sleeve having a longitudinal sleeve axis S defining a releasing direction (D) and a cage located within the clamping sleeve, the cage comprising at least one load member housing having a load member accommodated therein, the cage having inner and outer cage surfaces, the inner cage surface comprising a major abutment wall connected to a minor abutment wall, the major abutment wall forming an angle $\alpha \leq 90°$ with a plane (T) tangent to the minor abutment wall; and a stopper wall perpendicular to the minor and major abutment walls, the minor and major abutment walls being parallel to the holder axis (H); the clamping sleeve having inner and outer sleeve surfaces, the inner sleeve surface comprising first and second inner sections extending over a given length parallel to the sleeve axis (S) and defined by points $P_1$ and $P_2$ in a cross section taken perpendicular to the sleeve axis (S); a point $P_3$ further from the sleeve axis (S) than the points $P_1$ and $P_2$ divides the second inner section into first and second portions.

13. A method for assembling the cutting tool of claim 1, comprising the steps of:
    rotating the clamping sleeve to the released position of the cutting tool;
    introducing the insert shank into the cage until the rear surface of the cutting insert abuts the stopper wall of the cage; and
    rotating the clamping sleeve in the direction opposite to the releasing direction (D) until the cutting tool is in the secured position.

14. A holder having a longitudinal holder axis (H), a holder shank connected to a clamping portion, wherein the clamping portion comprises:
    a clamping sleeve having a longitudinal sleeve axis (S) defining a releasing direction (D), the clamping sleeve comprising:
        an outer sleeve surface; and
        an inner sleeve surface which comprises:
            a first inner section that follows a cylindrical contour and is connected at circumferentially opposite first and second locations to a second inner section that bulges in a radially outward direction and defines an inner sleeve recess in the clamping sleeve, the inner sleeve recess having a varying radial dimension and comprising first and second portions which meet at a third location on the inner surface that is farther from the sleeve axis (S) than the spaced apart circumferentially opposite first and second locations at which the first and second inner sections are connected; and a cage located within the clamping sleeve, the cage comprising:
- at least one load member housing having a load member accommodated therein;
- an outer cage surface; and
- an inner cage surface comprising:
  - a minor abutment wall extending along the holder axis (H);
  - a major abutment wall extending along the holder axis (H) and forming an angle $\alpha \leq 90°$ with the minor abutment wall; and
  - a stopper wall located at a rear end of the cage.

15. A cutting tool comprising:

a holder having a longitudinal holder axis (H), a holder shank connected to a clamping portion, wherein the clamping portion comprises:
- a clamping sleeve having a longitudinal sleeve axis (S) defining a releasing direction (D), the clamping sleeve comprising:
  - an outer sleeve surface; and
  - an inner sleeve surface which comprises:
    - a first inner section that follows a cylindrical contour and is connected at circumferentially opposite first and second locations to a second inner section that bulges in a radially outward direction and defines an inner sleeve recess in the clamping sleeve, the inner sleeve recess having a varying radial dimension and comprising first and second portions which meet at a third location on the inner surface that is farther from the sleeve axis (S) than the spaced apart circumferentially opposite first and second locations at which the first and second inner sections are connected; and a cage located within the clamping sleeve, the cage comprising:
- at least one load member housing having a load member accommodated therein;
- an outer cage surface; and
- an inner cage surface comprising:
  - a minor abutment wall extending along the holder axis (H);
  - a major abutment wall extending along the holder axis (H) and forming an angle $\alpha \leq 90°$ with the minor abutment wall; and
  - a stopper wall located at a rear end of the cage; and a cutting insert having an insert axis (B) and comprising an insert shank and a cutting portion, the insert shank having a peripheral surface comprising a cylindrical portion and a non-cylindrical portion, the cutting portion having a cutting tip which includes at least one cutting edge;

wherein:

the cutting insert shank is located in the cage; and the clamping sleeve is rotatable between:
- (a) a released position in which the load member is positioned between the second portion and the holder axis (H); and
- (b) a secured position in which the load member is located between the first portion and the holder axis (H), the non-cylindrical portion of the insert shank abuts the major abutment wall, the cylindrical portion of the insert shank abuts both the minor abutment wall and the load member, and the load member abuts the first portion.

* * * * *